Figure 1:
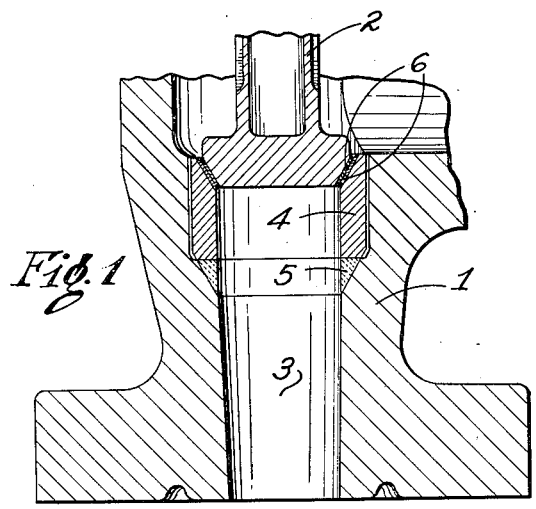

Jan. 1, 1946. J. C. HOBBS 2,391,899

VALVE SEAT CONSTRUCTION

Filed June 15, 1943

INVENTOR.
JAMES CLARENCE HOBBS
BY
Richey & Watts
ATTORNEYS

Patented Jan. 1, 1946

2,391,899

UNITED STATES PATENT OFFICE 2,391,899

VALVE SEAT CONSTRUCTION

James Clarence Hobbs, Painesville, Ohio

Application June 15, 1943, Serial No. 490,912

6 Claims. (Cl. 251—27)

This invention relates to fluid valves and more particularly to valves for use with fluids under high pressure, for example, high temperature high pressure steam or medium temperature water under high pressure. Altho the present invention is particularly adapted for fluid pressures on the order of 2500 pounds per square inch, it is also suitable for pressures down to 1000 pounds per square inch or lower.

In its more specific aspects this invention relates to a new and improved form of valve seating element and its association with such a valve.

This application is a continuation-in-part of my co-pending application Ser. No. 320,476, filed February 23, 1940, from which Patent No. 2,321,597, issued on June 15, 1943.

Prior to the present invention the valves which were available for high pressure fluids were generally similar in design to the valves previously used for much lower pressures, the main difference being that the parts of the older valves were greatly enlarged to make them strong enough to withstand the higher pressures. In other words, the design of the high pressure valves available on the market now is more or less orthodox and involves no fundamental differences over the long used low pressure valves and include no particular means, except heavier metal parts, for meeting the needs peculiar to control of fluids under high pressures.

The present day high pressure valves possess a number of important disadvantages. They are composed of large, heavy metal parts and, therefore, are uneconomical as regards the space required, the supports required to support their weight, and the large amount of metal which is present in their construction. Any decrease which is possible in the size, weight and amount of metal employed in high pressure valves is quite important because of the resultant saving in space, in supporting means and in cost of metal, and in reduction of temperature differentials and corresponding stresses.

The valve bodies of the present-day high pressure valves are provided with large flanges around some of, or all, the openings, particularly the opening which receives the valve unit and usually at the openings where pipe connections are to be made. The parts which are to be connected to such flanges are likewise flanged. Gaskets are used between two opposed flanges to seal the opening and a large number of good sized bolts spaced short distances apart are relied on to compress the gasket and prevent escape of high pressure fluid between the flanges. Not only is this construction unduly heavy but also it is not safe when in use. Since the pressure area of the valve body opening is much smaller than that of the gasket or sealing area, and since the load varies directly as the square of the diameter of the sealing area, the load which bolts must carry is greater than the actual load on the valve body. It is necessary, therefore, to provide flanges and bolts which will withstand this increased load, and to place the flange bolts as close together as possible, for the load must be carried by the tensile strength of the bolts. If the load is sufficient to stretch the bolts even slightly, the high pressure fluid may escape past the gasket, and if it is sufficiently high to exceed the ultimate strength of the bolts and break them, the entire valve fails and may result in injury to workmen as well as the shutting down of a power plant costing millions of dollars.

Moreover, such construction does not permit any relative expansive and contractive movement of one valve part relative to another with temperature changes, and since the valve parts are not subjected to equal and simultaneous heating and cooling, considerable variation in the sizes of the two adjacent parts is common. For example, when high temperature fluid is admitted into a flanged valve body, the body will expand at a rate different from that of a flanged connection at the valve unit opening. Such differential expansion can take place in present day valves only by deflection of the weaker of two differently expansible elements or parts. While present-day valve constructions may permit such deflections at lower temperatures, it seems that there is a limit at about 500° F. fluid temperature beyond which either the joints become leaky or the bolts become overstrained or broken when differential expansion occurs.

The present invention aims to avoid many of the disadvantages and shortcomings of present-day high pressure valves, particularly those traceable to the valve seat and valve seating elements of such valves. It achieves the same by the simplified, yet highly effective, construction and combination of parts and operation of these parts as described and claimed hereinafter.

Figure 2:
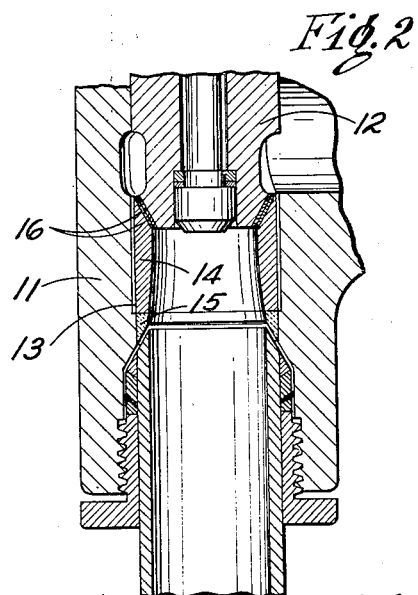
Figure 3:
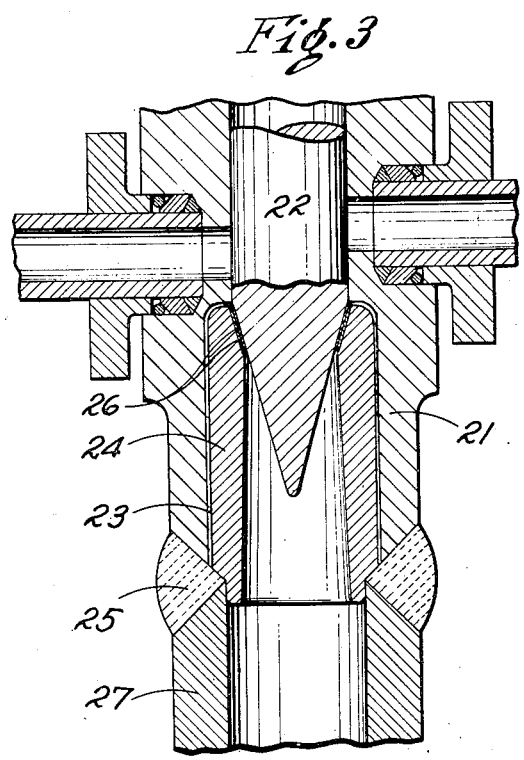
Figure 4:
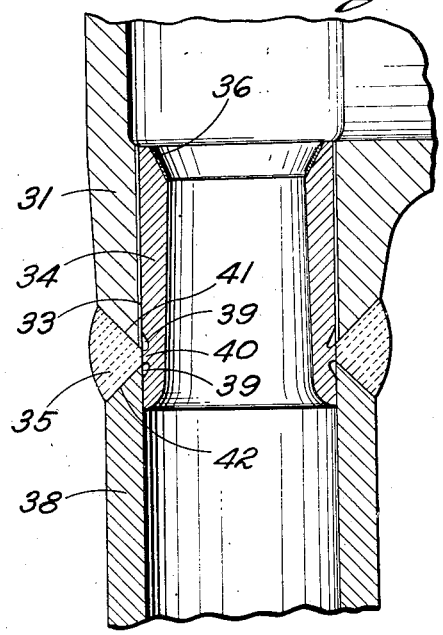

In the drawing accompanying and forming a part of this specification:

Figure 1 is a fragmentary, sectional view of a high pressure check valve embodying the present invention in one of its forms; and Figures 2, 3 and 4 are similar views of high pressure control valves embodying other forms of the present invention.

In Figure 1 the valve body 1 is equipped with a check valve 2. A passage 3 serves for the flow of high pressure fluid in the body 1. An elongated, thin walled tube 4 is positioned in passage 3 and is secured in position by weld metal 5 at one end thereof. At the other end tube 4 is shaped to provide a seat for valve 2. In this particular form the opposed surfaces of the valve 2 and tube 4 are faced with layers 6 of stellite or similar wear-resisting metal. The engaging surfaces of the valve and tube are disposed at an angle of more than ten degrees to the axis of the passage 3 so that the stream of fluid flowing thru the tube will not follow the seating surfaces thereon and thereby cut them away or form grooves in them, as might take place if the angularity was less than ten degrees.

In Figure 2 the valve body 11 is equipped with a valve 12 and has a passage 13 for the flow of high pressure fluid. Within that passage an elongated, thin walled tube 14 is secured by weld metal 15 which unites one end of the tube to the body 11. The other end of tube 14 is provided with a surface for seating valve 12. As in Fig. 1, the opposed surfaces of the tube and valve are covered with wear-resistant metal 16 and the surfaces are inclined at an angle of more than ten degrees of the axis of the passage 13.

In Figure 3 the valve body 21 is equipped with a valve 22 and has a passage 23 for high pressure fluid. An elongated, thin walled tube 24 is secured in passage 23 as by weld metal 25 at one end thereof. At the other end it is provided with a surface for seating valve 22. As in the preceding instances, the engaging surfaces of the tube 24 and valve 22 are preferably covered with layers of wear-resistant metal 26. The valve seating surface of tube 24 is preferably inclined at an angle of more than ten degrees to the axis of the passage 23.

In Figure 3 the weld metal 25 is shown as serving the additional purpose of attaching a pipe 27 to the body 21 with the interior of the pipe communicating with the interior of tube 24.

If desired, tube 24 may be an integral part of pipe 27 and weld metal 25 may connect either or both of those parts of the pipe to the body 21.

In Figure 4 the valve body 31 has an elongated, thin walled tube 34 positioned in passage 33 thru the body and secured in place by weld metal 35 disposed near one end of the tube 34. The other end of the tube is provided with a surface to seat a valve (not shown) and this surface is preferably covered with wear-resisting metal 36. As in prior cases, the angularity of this valve seating surface is preferably greater than ten degrees to the axis of the passage 33.

The weld metal 35 also serves to connect a pipe 38 to the body 31. An important feature of the apparatus of Fig. 4 is the manner of connecting the tube 34, body 31 and pipe 38. Since the weld metal 35 is attached to the tube 34 some little distance from the end of the latter, none of the weld metal may get into the interior of the valve or its connections. Furthermore, differential expansion and contraction of these several parts does not cause breakage of any of the parts. This result follows primarily, I believe, from the provision of the recesses 39 in the outer surfaces of tube 34 which leave a land 40 therebetween. Preferably, this land 40 is of substantially the size of the space between the bevelled edges 41 and 42 of the body 31 and pipe 38. With the body, tube and pipe assembled as shown, these parts may be united by weld metal 35, the connection of the weld metal to tube 34 being limited substantially to the surface of the land 40. The recesses 39 act as fillets at the junction of the weld metal and the tube 34 and tend to prevent the initiation or penetration of cracks at that point, thus increasing the resistance of the junction to breakage.

Figures 1, 2 and 4 show parts of the apparatus of Figs. 1, 2 and 5 respectively of copending application Ser. No. 320,476, now Patent No. 2,321,597, which issued June 15, 1943, while Fig. 3 shows parts of the apparatus originally shown in another figure of that application and now shown in my copending application Ser. No. 490,911, filed June 15, 1943. Other subject-matter shown but not claimed in the aforesaid Patent No. 2,321,597 is being claimed in my copending applications 490,912 and 490,913 filed June 15, 1943.

In the above described modifications, the valve seating tubes have thin walls and the valves are capable of limited lateral movement in their bodies. The thickness of the walls of the tubes is small enough to afford the elasticity necessary for the tubes to accommodate the lateral movement of the valves and to resist the normal deforming forces of the high pressure fluid within the tubes and of the valves, but is not great enough to provide the safety factor which is required by governing codes. In other words, each tube may accommodate itself to the shifting of the valve and will resist deformation under the normal forces exerted by the valve and by the fluid pressure, but it does not possess the additional strength required as a safety factor. To provide that safety factor I rely on a member surrounding the tube. That member, as shown, is the valve body but, if desired, it may be a member surrounding the tube within the body. Between the outer surface of the tube and the inner surface of such member, I provide a small clearance which is large enough to permit limited relative movement, or distortion of either, of these parts but is so small that, under abnormal pressures, the tube may bear on and be supported by that member. This small clearance is shown greatly exaggerated in each of the figures between the bodies 1, 11, 21 and 31, and the tubes 4, 14, 24 and 34, respectively, in Figs. 1 to 4.

As an illustration, a tube composed of steel having an elastic limit of from 40,000 to 60,000 pounds per square inch, an outside diameter of 2" and a wall thickness of 0.2", will withstand, without permanent deformation, a fluid pressure of up to 5,000 pounds per square inch. A radial clearance of about .001" between the outer surface of that tube and the opposed surface of the surrounding member will permit limited deformation of the tube, under higher and abnormal stresses, but those surfaces will engage before the elastic limit of the tube has been exceeded and thus the surrounding member will support the tube and provide the necessary safety factor therefor.

In this manner I am able to realize all the advantages traceable to the use of a thin tube and yet to meet code requirements as regards safety factor.

In view of what has been said it will be understood that valves embodying the present invention have a considerable amount of "flexibility" due to the fact that the tube is deformable to a small extent at its free end and that the body and tube are relatively movable in the region of that end. If and when the valve plug or disk is not exactly aligned with the tube, by reason of deflection of the piping or otherwise, the tube can be deformed to accommodate the valve plug or disk and make or maintain a fluid-tight seal therewith. The relative movability of the body and tube in the region of its free or valve-engaging end insures tight sealing when the body and tube are at widely different temperatures and also when the piping transmits deflecting forces to the body. Thus the elongated deformable tube cooperates with the valve plug or disk to make and maintain a fluid-tight seal under all conditions; and also cooperates with the body so as not to be deformed with resultant leakage when bending forces are transmitted from the piping to the valve body. This cooperation of the tube with both the body and the valve plug or disk provides the "flexibility" necessary for the creation and maintenance of a tight fluid seal under such conditions as wide and sudden temperature variations, high or low pressures, or wide and sudden changes in pressures.

Having thus described my invention so that others skilled in the art may be able to understand and practice the same, I state that what I desire to secure by Letters Patent is defined in what is claimed.

What is claimed is:

1. A valve, for sealing fluids under conditions of temperatures, pressures and deforming forces which may vary widely, comprising a valve body having a passage, an elongated tube in said passage, said tube having a deformable free end and a seating surface substantially at said end, circumferentially continuous fluid-tight means integrally connecting said body and said tube remote from said free end, and a closure axially movable into and out of contact with said seating surface and capable of deforming said free end to make and maintain a fluid-tight seal with said seating surface, said body and tube defining therebetween a small space which surrounds said tube and is of such lateral and axial extent as to permit limited relative movement of the body and tube without breaking said seal under varying temperatures, pressures and deforming forces and to allow said tube, when subjected to abnormal deforming forces, to engage and be supported by the wall of said passage before structural failure of the tube occurs.

2. A valve, for sealing fluids under conditions of temperatures, pressures and deforming forces which may vary widely, comprising a valve body having a passage, an elongated tube in said passage, said tube having a deformable free end and a seating surface substantially at said end, circumferentially continuous weld metal integrally connecting said body and said tube remote from said free end, and a closure axially movable into and out of contact with said seating surface and capable of deforming said free end to make and maintain a fluid-tight seal with said seating surface, said body and tube defining therebetween a small space which surrounds said tube and is of such lateral and axial extent as to permit limited relative movement of the body and tube without breaking said seal under varying temperatures, pressures and deforming forces and to allow said tube, when subjected to abnormal deforming forces, to engage and be supported by the wall of said passage before structural failure of the tube occurs.

3. A valve, for sealing fluids under conditions of temperatures, pressures and deforming forces which may vary widely, comprising a valve body having a passage, an elongated tube in said passage and surrounded for substantially its full length by said body, said tube having a deformable free end and a seating surface substantially at said end, circumferentially continuous fluid-tight means integrally connecting said body and said tube remote from said free end, and a closure axially movable into and out of contact with said seating surface and capable of deforming said free end to make and maintain a fluid-tight seal with said seating surface, said body and tube defining therebetween a small space which surrounds said tube and is of such lateral and axial extent as to permit limited relative movement of the body and tube without breaking said seal under varying temperatures, pressures and deforming forces and to allow said tube, when subjected to abnormal deforming forces, to engage and be supported by the wall of said passage before structural failure of the tube occurs.

4. A valve, for sealing fluids under conditions of temperatures, pressures and deforming forces which may vary widely, comprising a valve body having a passage, an elongated tube in said passage, said tube having a deformable free end and a seating surface substantially at said end, a filleted land on the exterior and near the other end of said tube and circumferentially continuous weld metal integrally connecting said body to said land, and a closure axially movable into and out of contact with said seating surface and capable of deforming said free end to make and maintain a fluid-tight seal with said seating surface, said body and tube defining therebetween a small space which surrounds said tube and is of such lateral and axial extent as to permit limited relative movement of the body and tube without breaking said seal under varying temperatures, pressures and deforming forces and to allow said tube, when subjected to abnormal deforming forces, to engage and be supported by the wall of said passage before structural failure of the tube occurs.

5. A valve, for sealing fluids under conditions of temperatures, pressures and deforming forces which may vary widely, comprising a valve body having a passage, an elongated tube in said passage, said tube having a deformable free end and a seating surface substantially at said end, a surface near the other end and circumferentially continuous weld metal integrally connecting said body to the last said surface, and a closure axially movable into and out of contact with said seating surface and capable of deforming said free end to make and maintain a fluid-tight seal with said seating surface, said body and tube defining therebetween a small space which surrounds said tube and is of such lateral and axial extent as to permit limited relative movement of the body and tube without breaking said seal under varying temperatures, pressures and deforming forces and to allow said tube, when subjected to abnormal deforming forces, to engage and be supported by the wall of said passage before structural failure of the tube occurs.

6. A valve, for sealing fluids under conditions of temperatures, pressures and deforming forces which may vary widely, comprising a valve body having an inlet opening, a central passage and an outlet opening in a side wall of said passage, an elongated tube in said passage, said tube having a deformable free end and a seating surface substantially at said end, circumferentially continuous fluid-tight means integrally connecting said body and said tube remote from said free end, and a valve stem axially movable in said central passage, said stem having a side surface in sliding engagement with the walls of said passage and about said outlet opening to control the flow of fluid therethru and having an end surface movable into and out of contact with said seating surface and capable of deforming the free end of said tube to make and maintain a fluid-tight seal with said seating surface, said body and tube defining therebetween a small space which surrounds said tube and is of such lateral and axial extent as to permit limited relative movement of the body and tube without breaking said seal under varying temperatures, pressures and deforming forces and to allow said tube, when subjected to abnormal deforming forces, to engage and be supported by the wall of said passage before structural failure of the tube occurs, said limited movement of said tube relative to said body permitting control of the outlet opening by said stem and seating of the stem on the tube under varying operating conditions.

JAMES CLARENCE HOBBS.